Patented Mar. 8, 1949

2,464,192

UNITED STATES PATENT OFFICE 2,464,192

WATER DISPERSIBLE TITANIUM DIOXIDE

Walter R. Whately, Lynchburg, Va., assignor to American Cyanamid Company, New York, N. Y., a corporation of Maine No Drawing. Application March 1, 1948, Serial No. 12,481

2 Claims. (Cl. 23—202)

This invention relates to the production of titanium dioxide pigments, and relates more particularly to the production of water-dispersible titanium dioxide pigments of extremely fine texture. The present application is a continuation-in-part of application Serial No. 666,844, filed May 2, 1946, now abandoned.

Ordinarily, titanium dioxide is precipitated by hydrolysis as the hydrous oxide from sulfate, chloride, or other salt solutions, and is calcined at relatively high temperatures, as from about 700° C. to about 1100° C. to develop pigment properties. This calcination treatment produces aggregates of pigment particles which are subjected to milling or pulverizing treatment to reduce the aggregates to the desired particle size. The preferred practice includes the wet milling of the pigment followed by hydroclassification of the pigment to remove undesirably large particles over 4 microns diameter. The hydroclassification treatment is usually carried out with a relatively dilute aqueous slurry of the pigment and the approximately optimum-size pigment particles having an average particle size of about 0.5 microns or less are present in deflocculated difficultly filterable condition.

In some instances, it has been found necessary to employ a dispersion agent in order to adequately disperse the calcined pigment in water prior to the hydroclassification treatment. Among the several alkaline compounds which have been found to be suitable for this purpose are the various alkaline alkali metal and ammonium compounds such as, for example, sodium hydroxide, sodium carbonate, sodium orthophosphate, ammonium hydroxide, and the like compounds.

The dispersed titanium dioxide pigment is flocculated, in order to facilitate filtration and washing of the pigment, by the addition thereto of various flocculating agents. Sulfuric acid and magnesium sulfate have been found to be extremely efficient in flocculating water-dispersed titanium dioxide particles, and these materials have been used extensively for this purpose.

A titanium dioxide pigment which has been flocculated with either sulfuric acid or magnesium sulfate has good texture characteristics, and after washing, drying, and pulverizing is satisfactory for use in paints employing various drying oils as vehicles. However, titanium dioxide pigment which has been flocculated from water-dispersion by either of these agents is entirely unsuitable for use in paints, paper, leather, and the like materials wherein water constitutes the vehicle. This is apparently due to the fact that the small amount of flocculent which is retained on the pigment prevents its subsequent redispersion in water.

It is believed that the dispersibility of titanium dioxide in water is due to the negative charge of the individual particles, which renders them mutually repellent and thus capable of being dispersed in water. Upon addition of magnesium sulfulate or sulfuric acid to water dispersions of calcined titanium dioxide, the divalent magnesium ions and the monovalent hydrogen ions of the acid apparently satisfy the negative charge of the titanium dioxide, thus causing the dispersed pigment particles to floc. Although the amount of flocculant retained on the pigment is quite small, it is sufficiently active so that on subsequent addition of the pigment to water the small amount of retained flocculant again ionizes and neutralizes the negative charge of the titanium dioxide, thus causing flocculation of the pigment particles.

In one specific instance, an aqueous slurry of hydroclassified titanium dioxide was flocculated by the addition thereto of 0.6% $MgSO_4.7H_2O$ based on the amount of titanium dioxide present in the slurry. The material was filtered, washed twice with water, and dried. The resulting pigment was thereafter dispersible in water only to the extent of 1%, although analysis showed that the product contained only 0.14% $MgSO_4$. Similar experiments carried out employing sulfuric acid as the flocculating agent indicated that even smaller amounts, in the neighborhood of 0.05%, of retained sulfuric acid prevented the pigment from being redispersible in water. These experiments indicate that such flocculants cannot be removed completely from titanium dioxide flocculated therewith by simple water-washing treatment such as is accorded the material in ordinary commercial practice, and that the small quantiy retained after washing prevents redispersion of the pigment in water.

The present invention is based on the discovery that hydro classified calcined titanium dioxide pigment may be completely flocculated from water-dispersions thereof by the addition thereto of relatively small amounts of neutral water-soluble salts of alkali metals. I have discovered that, most unexpectedly, titanium dioxide pigments which have been flocculated from aqueous dispersion by the addition of small amounts of neutral water-soluble alkali metal salts do not thereby lose their water-dispersibility, the products being from about 92% to about 97% redispersible in water.

Although the precise manner in which my preferred flocculating agents act to flocculate hydroclassified titanium dioxide pigment from water dispersion has not been definitely determined, I believe that the flocculation is due to the fact that the alkali metal ions are relatively less mobile than the hydrogen ion of sulfuric acid and the ions of divalent metals. Thus, the very small amounts of my preferred flocculating agents which may be retained on the pigment subsequent to the flocculation and washing treatments are insufficient to neutralize the negative charge of the titanium dioxide particles on subsequent redispersion thereof in water. Consequently, hydroclassified calcined titanium dioxide pigment which has been flocculated according to my novel method is subsequently almost completely dispersible in water. The outstanding advantage of the present invention, therefore, resides in the employment, as flocculants for hydroclassified calcined titanium dioxide, of neutral salts of monovalent metals, the most effective of which have been found to be the salts of the alkali metals.

In its broader aspects, the present invention consists in the addition of a small amount of a neutral water-soluble salt of an alkali metal to an aqueous slurry of hydroclassified titanium dioxide pigment, whereby the pigment particles are flocculated and may be more easily handled in subsequent filtering and washing operations. An additional feature of the invention resides in the fact that substantially all of the soluble flocculant may be removed during the filtration of the flocculated pigment or during the subsequent water-washing treatment accorded the filter cake.

I have found that the minimum amount of alkali metal salt which it is necessary to employ in order to obtain complete flocculation of the water-dispersed pigment is about 0.6% based on the weight of the titanium dioxide. The upper limit of the amount of flocculant to be employed is not critical, but inasmuch as it is desirable to avoid the use of excessive quantities because of economical practicability, amounts in excess of about 2% are seldom employed. Furthermore, in order that the flocculated pigment may be most easily filtered and washed, the best results are obtained when from about 0.7% to about 1.5% of the flocculating agent is employed based on the weight of the titanium dioxide.

Most unexpectedly, I have found that the amount of alkali metal salt required to obtain complete flocculation of the dispersed hydroclassified titanium dioxide is in no way dependent on the degree of alkalinity of the aqueous pigment dispersion. Thus, where it is necessary to employ an alkaline dispersing agent in order to obtain complete dispersion of the pigment, the amount of my novel flocculating agent which it is necessary to employ to completely flocculate the dispersed pigment is not appreciably greater than where no such alkaline dispersing agent has been employed. This feature of the invention will hereinafter be pointed out with particularity in the illustrative examples of the invention. On the other hand, and although it does not constitute a part of this invention, where free acid is employed the amount necessary to obtain complete flocculation of the pigment may be substantially reduced by the presence of very small amounts of my novel flocculating agents. However, where such procedures are resorted to, the product obtained is not as completely redispersible in water as the product obtained according to my preferred method which is carried out at pH values of substantial neutrality or under alkaline conditions. The terms "substantial neutrality" or "alkaline conditions," are to be understood to means that the aqueous medium containing the hydroclassified titanium dioxide is alkaline to chlorophenol red, which is effective as an indicator of alkalinity at pH values in excess of 6.4.

In order that the invention may be more easily understood, the following specific examples are given. It is to be understood however, that the examples are given primarily for the purpose of illustration, the scope of the invention being defined by the appended claims.

Example 1

An aqueous slurry of hydroclassified calcined titanium dioxide containing 188 grams of $TiO_2$ per liter was adjusted to various pH values by the addition of a 10% aqueous sodium hydroxide solution. After each adjustment, the $TiO_2$ was flocculated by the addition of 0.75% $Na_2SO_4$ as a 10% solution, all of the $TiO_2$ being flocculated in each instance. After flocculation, the precipitated $TiO_2$ was filtered, dried at 105° C., and thereafter pulverized and redispersed in water. The results are tabulated below.

| ph of Slurry at Flocculation | Per Cent $TiO_2$ Flocculated | Per Cent Redispersion in $H_2O$ of the Flocculated $TiO_2$ |
|---|---|---|
| 11.0 | 100 | 93.2 |
| 10.0 | 100 | 89.0 |
| 9.0 | 100 | 93.2 |
| 8.0 | 100 | 94.4 |
| 7.0 | 100 | 92.9 |
| 6.0 | 100 | 88.2 |

This example shows that the addition of a very small quantity of a neutral alkali metal salt to an aqueous dispersion of calcined hydroclassified $TiO_2$ serves to flocculate the $TiO_2$ regardless of the pH value of the slurry to which the salt is added. When the example was repeated employing sulfuric acid as the flocculant, at pH 7.0 only 8.5% of the $TiO_2$ had been flocculated, thus indicating that the minute amount of $Na_2SO_4$ formed during the neutralization of the sodium hydroxide has little or nothing to do with the flocculation of the titanium dioxide. It also serves to illustrate the fact that an acid flocculant is ineffective under alkaline conditions.

Example 2

2000 grams of calcined $TiO_2$ was micropulverized and dispersed in 10 liters of water. The slurry was allowed to settle for about 3 hours, this being the time calculated as necessary to settle out all the particles of 4 microns diameter or larger. After decantation 9990 grams of slurry was obtained, containing 1323 grams of $TiO_2$ and having a specific gravity of 1.11, and a pH of 7.3. This hydroclassified slurry was flocculated by the slow addition thereto of 13.2 grams of sodium chloride dissolved in 100 cc. of water. The slurry was agitated for 15 minutes after the addition of the sodium chloride to insure complete flocculation. The material was then filtered, washed with 300 cc. of water, dried at 130° C., milled and pulverized. The resulting pigment had exceptionally good texture characteristics and a water dispersion rating of 94.3%.

The water-dispersion rating was calculated by dispersing 25 grams of the flocculated hydroclassified $TiO_2$ in 250 ml. of water, and allowing the dispersion to stand for 4 hours. Thereafter, the top 50 ml. portion of the dispersion was taken, flocculated, filtered, and the residue was dried to ascertain the amount of the pigment which remained dispersed in the water after the 4 hour period.

*Example 3*

1000 cc. of an aqueous slurry of hydroclassified calcined $TiO_2$, containing 214 grams of $TIO_2$ and having a pH of 7.3, was flocculated by the slow addition thereto of 2.14 grams of $KNO_3$ (10% aqueous solution). The slurry was agitated for 30 minutes and was thereafter filtered, washed with 100 cc. of water, and the precipitate was dried at 160° C. The resulting pigment had very good texture characteristics and a water dispersion rating of 94.6%.

*Example 4*

The procedure followed was similar to that of Example 3 except that 3.21 grams of KCl was employed instead of the $KNO_3$. The resulting pigment had good texture characteristics and a water dispersion rating of 92.4%.

*Example 5*

1000 cc. of an aqueous slurry of hydroclassified calcined $TiO_2$, containing 214 grams of $TiO_2$ and a pH of 7.2 was flocculated by the slow addition thereto of 2.14 grams of $Li_2SO_4$ (10% aqueous solution). The slurry was agitated for 30 minutes and was then filtered, washed with 100 cc. of water, and the precipitate was dried at 160° C. The resulting pigment was of extremely fine texture, and had a water dispersion rating of 95.0%.

*Example 6*

The procedure of Example 5 was repeated except that 4.28 grams of LiCl was employed instead of the $Li_2SO_4$. The flocculated pigment was very thoroughly washed to remove as much of the flocculant as possible. The resulting pigment was of very fine texture, and had a water-dispersion rating of 95.7%.

What I claim is:

1. In a process for the production of water dispersible titanium dioxide pigments, the step which consists in flocculating hydroclassified calcined titanium dioxide dispersed in an aqueous medium which is alkaline to chlorophenol red by the addition thereto of from about 0.7% to about 2%, based on the weight of the calcined titanium dioxide, of a water-soluble neutral alkali metal salt.

2. In a process for the production of water dispersible titanium dioxide pigments, the step which consists in flocculating hydroclassified calcined titanium dioxide dispersed in an aqueous medium which is alkaline to chlorophenol red by the addition thereto of from about 0.7% to about 2%, based on the weight of the calcined titanium dioxide, of sodium sulfate.

WALTER R. WHATELY.

No references cited.